Patented June 3, 1930

1,761,620

UNITED STATES PATENT OFFICE

JOSEPH DEINET, OF MILWAUKEE, WISCONSIN, ASSIGNOR TO THE NEWPORT COMPANY, OF CARROLLVILLE, WISCONSIN, A CORPORATION OF DELAWARE

METHOD FOR THE PREPARATION OF CHLORINATED ANTHRAQUINONES

No Drawing.    Application filed December 19, 1927.   Serial No. 241,273.

This invention relates to a method for the preparation of chlorinated anthraquinones, as for instance, 1,5-dichloro anthraquinone, 1,8-dichloro anthraquinone, 1-nitro 5-chloro anthraquinone, 2-chloro anthraquinone, and the like.

It is an object of this invention to provide an improved, economical and practical method for the preparation of chlorinated anthraquinones by the replacement of the sulfonic acid group in an anthraquinone body with chlorine. I am aware that methods have been previously described for the preparation of these products. The present process, however, possesses many advantages over previously disclosed methods as regards economy of raw materials and in the simplicity of the apparatus necessary for technical manufacture.

Other and further important objects of this invention will be apparent from the disclosures in the specification and the appended claims.

Hitherto known methods, in general, employ as starting material, the isolated sulfonic acid salts. Further, as a reaction medium these methods employ hydrochloric acid and the general procedure consists in introducing either chlorine as such, or sodium chlorate, into the solution of the respective sulfonic acid in the hydrochloric acid.

In the present invention, there is described a method whereby sulfuric acid is used as the reaction medium. By my process, it is not necessary to employ an isolated sulfonic acid salt as starting material, for the reaction medium employed may be the diluted sulfonation mass itself. However, it is understood that isolated sulfonic acids may be employed, if desired, with sulfuric acid as the reaction medium. The general process comprises dissolving or suspending the sulphonic acid in diluted sulfuric acid, heating this mixture to the boiling point and slowly introducing a mixture of sodium chloride and sodium chlorate at the elevated temperature. The mixture of sodium chloride and sodium chlorate is preferably added in the form of a solution in order to regulate more closely the liberation of chlorine for chlorinating the anthraquinone sulphonic acids.

It was not obvious that sulfuric acid could be employed in making these products. In fact, it has been stated in the literature by an eminent authority that the reaction does not proceed under these conditions. This method not only possesses the advantage as described above, whereby an isolated sulphonic acid may be dispensed with, but allows less expensive apparatus to be used in the commercial production of these products, since the use of sulphuric acid permits lead lined apparatus to be utilized.

Without limiting my invention to any particular procedure, the following examples, in which parts by weight are expressed, illustrate embodiments of my preferred method:

Example I.

17 parts of anthraquinone are sulfonated according to well known methods to the 1,5,- 1,8,- mixture of anthraquinone disulfonic acids. The 1,5-acid is crystallized and filtered off and the filtrate poured into 400 parts of water. The diluted filtrate is brought to the boiling point and then a solution of 10 parts of sodium chloride and 10 parts of sodium chlorate in 60 parts of water is run in over a period of 12 hours. The dichloro anthraquinone, principally 1,8,- is filtered off and washed acid free. The yield is substantially equal to that theoretically expected.

Example II 10 parts of 1,5-nitro anthraquinone sulfonic acid are charged into 400 parts of water and 30 parts of concentrated (about 93%) sulfuric acid added to it. The mass is brought to boiling and then a solution of 10 parts of sodium chloride and 10 parts of sodium chlorate in 60 parts of water is slowly run in over a period of 10 to 12 hours. The resulting 1-nitro 5-chloro anthraquinone is filtered and washed acid free. The yield is close to the theoretical.

Example III 10 parts of anthraquinone are sulfonated in beta position, the mass then poured into 400 parts of water, the whole mass boiled up and filtered from unchanged anthraquinone. Into the filtrate together with the wash water, 5 parts of sodium chloride with 5 parts of sodium chlorate in 30 parts of water are slowly charged, the whole being at the boiling point. The resulting 2-chloro anthraquinone is filtered and washed acid free. The yield is close to that theoretically expected.

I am aware of the fact that chlorinating agents other than sodium chloride-sodium chlorate mixture may be used. In general, such reagents may be used as are adapted for the preparation of nascent chlorine. To be suitable halogenating agents, the oxidizing agent used for generating the nascent chlorine must be of such a nature that any excess used will not react to decompose the organic molecule.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing chloro-anthraquinones, which comprises treating a boiling solution of anthraquinone sulphonic acids in dilute sulphuric acid with sodium chloride and sodium chlorate.

2. The process of preparing 1,8-dichloro anthraquinone, which comprises heating a solution of 1,8-anthraquinone disulphonic acid in dilute sulphuric acid to the boiling point, adding sodium chloride and sodium chlorate simultaneously to said solution over a prolonged period of time and filtering off the resulting insoluble 1,8-dichloroanthraquinone.

3. The process of preparing chloro-anthraquinones, which comprises treating a solution of anthraquinone sulphonic acids in dilute sulphuric acid at around boiling temperatures with an alkali metal chloride and chlorate, said chloride and chlorate being slowly introduced in the form of a solution of the salts.

4. In the process of preparing chloro-anthraquinones, the step which comprises adding slowly to a boiling solution of an anthraquinone sulphonic acid in dilute sulphuric acid, a solution of an alkali metal chloride and chlorate.

5. In the process of preparing chloro-anthraquinones, the step which comprises adding slowly to a boiling solution of an anthraquinone sulphonic acid in dilute sulphuric acid, a solution of sodium chloride and sodium chlorate mixed in substantially equal proportions.

In testimony whereof I have hereunto subscribed my name.

JOSEPH DEINET.